(12) United States Patent
Kojima

(10) Patent No.: US 11,446,999 B2
(45) Date of Patent: Sep. 20, 2022

(54) VIBRATION-DAMPING DEVICE

(71) Applicant: Prospira Corporation, Kawasaki (JP)

(72) Inventor: Hiroshi Kojima, Tokyo (JP)

(73) Assignee: Prospira Corporation, Kawasaki (JP)

( * ) Notice: Subject to any disclaimer, the term of this patent is extended or adjusted under 35 U.S.C. 154(b) by 510 days.

(21) Appl. No.: 16/484,147

(22) PCT Filed: Jan. 11, 2018

(86) PCT No.: PCT/JP2018/000473
§ 371 (c)(1),
(2) Date: Aug. 7, 2019

(87) PCT Pub. No.: WO2018/193670
PCT Pub. Date: Oct. 25, 2018

(65) Prior Publication Data
US 2019/0389296 A1  Dec. 26, 2019

(30) Foreign Application Priority Data
Apr. 17, 2017 (JP) .............................. JP2017-081163

(51) Int. Cl.
*F16M 11/00* (2006.01)
*B60K 5/12* (2006.01)
(Continued)

(52) U.S. Cl.
CPC ........ *B60K 5/1208* (2013.01); *F16F 13/1463* (2013.01); *F16F 13/16* (2013.01)

(58) Field of Classification Search
CPC ............... B60K 13/1409; B60K 5/1208; F16F 13/1463; F16F 13/16
See application file for complete search history.

(56) References Cited

U.S. PATENT DOCUMENTS 5,172,893 A     12/1992   Bouhier et al.
6,561,501 B2 *  5/2003    Bouhier .................. F16F 13/18
                                                              267/219
(Continued)

FOREIGN PATENT DOCUMENTS

CN     1683806 A      10/2005
CN     201013828 Y    1/2008
(Continued)

OTHER PUBLICATIONS

Communication dated Apr. 22, 2020, issued by the European Patent Office in application No. 18787870.7.
(Continued)

*Primary Examiner* — Amy J. Sterling
(74) *Attorney, Agent, or Firm* — Kenja IP Law PC

(57) ABSTRACT

This vibration-damping device is configured such that an outer mounting member (11), an inner mounting member (12), or a partition member (16) has formed therein: a first restriction passage (23) for providing communication between a fourth liquid chamber (21) and a second liquid chamber (15) or a third liquid chamber (20); and a second restriction passage (24) for providing communication between the second liquid chamber (15) and the third liquid chamber (20). The flow resistance of the first restriction passage (23) and that of the second restriction passage (24) are different.

6 Claims, 3 Drawing Sheets

(51) Int. Cl.
*F16F 13/14* (2006.01)
*F16F 13/16* (2006.01)

(56) References Cited

U.S. PATENT DOCUMENTS

| | | | |
|---|---|---|---|
| 7,219,882 B2* | 5/2007 | Kato | F16F 13/1445 |
| | | | 267/141.2 |
| 7,441,757 B2* | 10/2008 | Siemer | 267/140.12 |
| 7,584,944 B2* | 9/2009 | Goudie | F16F 13/1418 |
| | | | 267/293 |
| 2003/0151178 A1* | 8/2003 | Vossel | F16F 13/16 |
| | | | 267/219 |
| 2005/0230889 A1 | 10/2005 | Minamisawa | |
| 2009/0283945 A1 | 11/2009 | Kojima et al. | |
| 2010/0213650 A1 | 8/2010 | Katayama et al. | |
| 2013/0038006 A1 | 2/2013 | Saito et al. | |

FOREIGN PATENT DOCUMENTS

| | | |
|---|---|---|
| JP | 61205502 A | 9/1986 |
| JP | 2008-111543 A | 5/2008 |
| JP | 2010-196747 A | 9/2010 |
| JP | 2011-133031 A | 7/2011 |
| JP | 2011-196453 A | 10/2011 |
| JP | 2012-87887 A | 5/2012 |
| JP | 2014-122675 A | 7/2014 |
| JP | 2017-044221 A | 3/2017 |

OTHER PUBLICATIONS

Communication dated Jul. 1, 2020, from the Chinese Patent Office in Application No. 201880014569.X.
International Search Report for PCT/JP2018/000473 dated Apr. 10, 2018 (PCT/ISA/210).

* cited by examiner

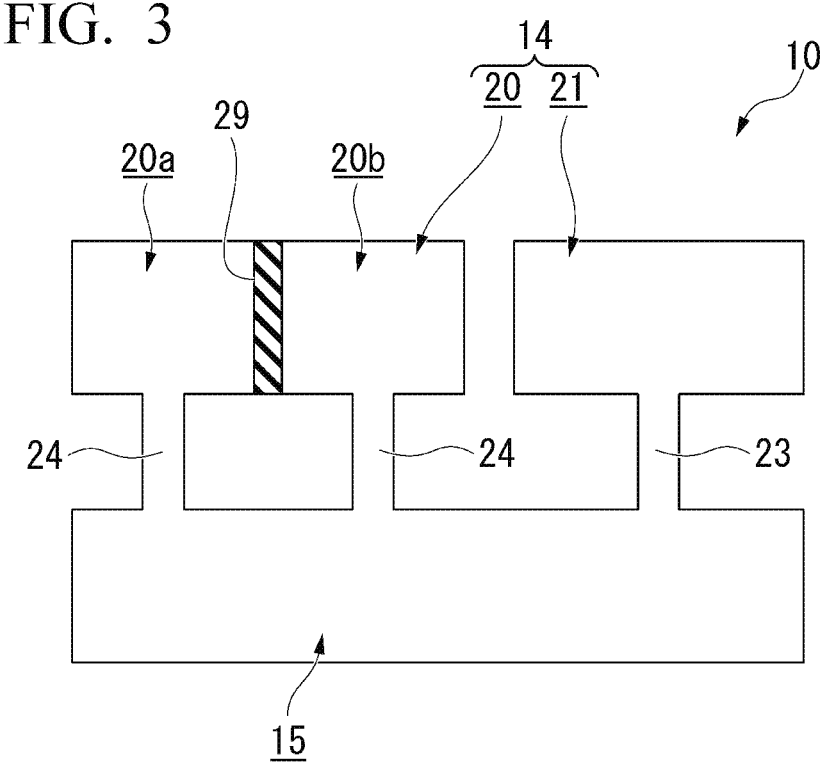

VIBRATION-DAMPING DEVICE

TECHNICAL FIELD

The present invention relates to a vibration-damping device which applies to, for example, automobiles, industrial machines, etc., and absorbs and damps vibrations of a vibration-generating portion such as an engine.

This application is a National Stage of International Application No. PCT/JP2018/000473 filed Jan. 11, 2018, claiming priority based on Japanese Patent Application No. 2017-81163, filed Apr. 17, 2017, the content of which is incorporated herein by reference.

BACKGROUND ART

Conventionally, for example, a vibration-damping device described in Patent Document 1 below is known. This vibration-damping device includes a tubular outer mounting member, and an inner mounting member disposed inside the outer mounting member, a pair of main body rubbers which connect between the outer mounting member and the inner mounting member, and are disposed at intervals in the axial direction along the central axis of the outer mounting member, and a partition member which connects the outer mounting member and the inner mounting member, and partitions a liquid chamber between the pair of main body rubbers into a first liquid chamber and a second liquid chamber in the axial direction. The partition member includes an annular rigid body portion in which a restriction passage for providing communication between the first liquid chamber and the second liquid chamber is formed, and an annular elastic portion connected to the rigid body portion in a radial direction intersecting the central axis.

In the vibration-damping device, when a vibration is input, a liquid flows between the first liquid chamber and the second liquid chamber through the restriction passage, thereby damping and absorbing the input vibration.

CITATION LIST

Patent Document

[Patent Document 1] Japanese Patent Application, First Publication No. 2011-196453

SUMMARY OF INVENTION

Technical Problem

However, the conventional vibration-damping device mentioned above has a problem in that it tends to stiffen when a vibration is input.

The present invention has been made in view of the above-described circumstances, and it is an object of the present invention to provide a vibration-damping device which can inhibit an increase in stiffness when a vibration is input while excellent damping performance is exhibited.

Solution to Problem

A vibration-damping device according to the present invention includes: a cylindrical outer mounting member which is connected to either one of a vibration-generating portion or a vibration-receiving portion and an inner mounting member which is connected to the other of the vibration-generating portion and the vibration-receiving portion and is disposed inside the outer mounting member; a pair of first main body rubbers which connect the outer mounting member and the inner mounting member and are disposed at an interval in an axial direction along a central axis of the outer mounting member; a partition member which partitions a liquid chamber between the pair of first main body rubbers into a first liquid chamber and a second liquid chamber in the axial direction; and a second main body rubber which divides the first liquid chamber into a third liquid chamber that uses the first main body rubber as a part of a partition wall and a fourth liquid chamber that uses the partition member as a part of a partition wall, in which a first restriction passage which communicates the fourth liquid chamber with the second liquid chamber or the third liquid chamber and a second restriction passage which communicates the second liquid chamber with the third liquid chamber are formed in the outer mounting member, the inner mounting member, or the partition member, and respective flow resistances of the first restriction passage and the second restriction passage are different from each other.

Advantageous Effects of Invention

According to the present invention, it is possible to inhibit an increase in stiffness when a vibration is input while excellent damping performance is exhibited.

BRIEF DESCRIPTION OF DRAWINGS

FIG. 3 is a schematic diagram of the vibration-damping device shown in FIGS. 1 and 2.

DESCRIPTION OF EMBODIMENTS

Hereinafter, a vibration-damping device 10 according to an embodiment of the present invention will be described with reference to the drawings.

Figure 1:
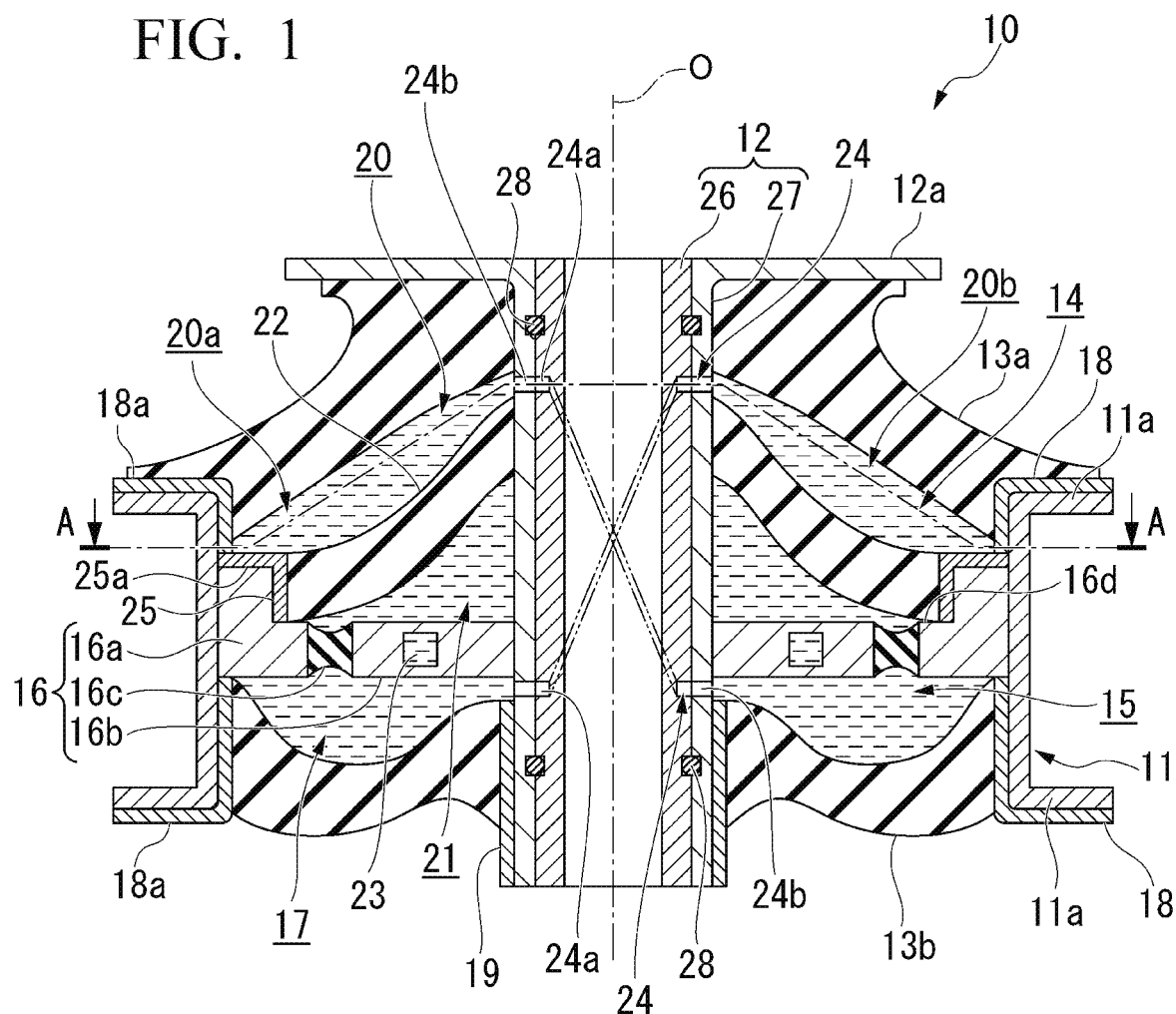
FIG. 1 is a longitudinal cross-sectional view of a vibration-damping device according to an embodiment of the present invention.

As shown in FIG. 1, the vibration-damping device 10 includes a cylindrical outer mounting member 11 which is connected to either one of a vibration-generating portion or a vibration-receiving portion and an inner mounting member 12 which is connected to the other of the vibration-generating portion and the vibration-receiving portion and is disposed inside the outer mounting member 11, a pair of first main body rubbers 13a and 13b which connect the outer mounting member 11 and the inner mounting member 12 and are disposed at intervals in an axial direction along a central axis O of the outer mounting member 11, and a partition member 16 which partitions a liquid chamber 17 between the pair of first main body rubbers 13a and 13b in the axial direction. In the liquid chamber 17, for example, ethylene glycol, water, silicone oil or the like is enclosed.

Hereinafter, a central portion of the outer mounting member 11 in the axial direction is referred to as an axial inner side, and an opening end side of the outer mounting member 11 in the axial direction is referred to as an axial outer side. Also, in plan view as viewed in the axial direction, a direction orthogonal to the central axis O is referred to as a radial direction, and a direction of rotating around the central axis O is referred to as a circumferential direction.

The vibration-damping device 10 may be applied to, for example, a cabin mount, and may be used in a state where the axial direction is directed in the vertical direction.

Receiving flange portions 11a protruding outward in the radial direction are formed at both outer end portions of the outer mounting member 11 in the axial direction. The receiving flange portion 11a extends continuously over the entire circumference.

Outer intermediate cylinders 18 are separately fitted into both outer end portions of the outer mounting member 11 in the axial direction. Support flange portions 18a protruding radially outward are formed at outer end portions of the outer intermediate cylinders 18 in the axial direction. The support flange portion 18a extends continuously over the entire circumference. The support flange portion 18a is disposed on the receiving flange portion 11a of the outer mounting member 11.

The inner mounting member 12 is disposed inside the outer mounting member 11 in the radial direction. The inner mounting member 12 has a tubular shape and is disposed coaxially with the central axis O. Both outer end portions of the inner mounting member 12 in the axial direction respectively protrude outward from the outer mounting member 11 in the axial direction.

A mounting flange portion 12a that protrudes outward in the radial direction is formed at an upper end portion of the inner mounting member 12 in the vertical direction. An inner intermediate cylinder 19 is externally fitted into a lower end portion of the inner mounting member 12 in the vertical direction. An outer circumferential surface of the inner intermediate cylinder 19 is radially opposed to an inner circumferential surface of one outer intermediate cylinder 18 of two outer intermediate cylinders 18 which is positioned on a lower side in the vertical direction.

The first main body rubbers 13a and 13b are connected to the outer mounting member 11 via the outer intermediate cylinders 18. The first main body rubbers 13a and 13b may be directly connected to the outer mounting member 11. The first main body rubbers 13a and 13b have an annular shape.

An upper first main body rubber 13a of the pair of first main body rubbers 13a and 13b positioned on an upper side in the vertical direction extends gradually downward from an inner side toward an outer side in the radial direction. A radial inner end portion of the upper first main body rubber 13a is integrally connected to over an outer circumferential surface of a vertical upper end portion of the inner mounting member 12 and a lower surface of the mounting flange portion 12a. A radial outer end portion of the upper first main body rubber 13a is integrally connected to over the inner circumferential surface of the outer intermediate cylinder 18 and an upper surface of the support flange portion 18a. The radial outer end portion of the upper first main body rubber 13a is bonded by vulcanization-bonding to the outer intermediate cylinder 18 and the radial inner end portion thereof is bonded by vulcanization-bonding to the inner mounting member 12.

A radial inner end portion of a lower first main body rubber 13b of the pair of first main body rubbers 13a and 13b positioned on a lower side in the vertical direction is formed in a curved surface shape protruding upward in the vertical direction. A radial outer end portion of the lower first main body rubber 13b is formed in a curved surface shape protruding downward in the vertical direction. The radial inner end portion of the lower first main body rubber 13b is connected (bonded by vulcanization-bonding) to the inner intermediate cylinder 19 and is connected to the inner mounting member 12 via the inner intermediate cylinder 19.

Also, the radial inner end portion of the lower first main body rubber 13b may be directly connected to the inner mounting member 12. A radial intermediate portion of the lower first main body rubber 13b is formed in a curved surface shape protruding downward in the vertical direction.

The partition member 16 has an annular shape and is disposed in the liquid chamber 17. The partition member 16 partitions the liquid chamber 17 into a first liquid chamber 14 and a second liquid chamber 15 in the axial direction. A volume of the first liquid chamber 14 positioned on an upper side in the vertical direction between the first liquid chamber 14 and the second liquid chamber 15 is larger than a volume of the second liquid chamber 15 positioned on a lower side in the vertical direction. Also, the present invention is not limited to this configuration, and, for example, the volume of the first liquid chamber 14 may be equal to or less than the volume of the second liquid chamber 15.

An outer circumferential surface of the partition member 16 is connected to an inner circumferential surface of the outer mounting member 11 and an inner circumferential surface of the partition member 16 is connected to an outer circumferential surface of the inner mounting member 12. The partition member 16 includes a cylindrical outer rigid body portion 16a connected to the outer mounting member 11, an annular inner rigid body portion 16b connected to the inner mounting member 12, and an annular connecting elastic portion 16c connecting the outer rigid body portion 16a and the inner rigid body portion 16b.

The outer rigid body portion 16a is connected to a portion of the inner circumferential surface of the outer mounting member 11 positioned between the outer intermediate cylinders 18. An annular protruding portion 16d which protrudes radially inward is formed at a lower end portion of the outer rigid body portion 16a. A cylindrical body 25 is fitted into a portion of the outer rigid body portion 16a which is positioned above the annular protruding portion 16d in the vertical direction. An annular plate portion 25a which protrudes outward in the radial direction and is disposed at an upper end opening edge of the outer rigid body portion 16a is formed at an upper end portion of the cylindrical body 25.

Here, in the two outer intermediate cylinders 18, a lower end of the outer intermediate cylinder 18 positioned on the upper side is in contact with or close to an upper surface of the annular plate portion 25a, and an upper end of the outer intermediate cylinder 18 positioned on the lower side is in contact with or close to a lower end opening edge of the outer rigid body portion 16a.

The connecting elastic portion 16c is made of, for example, a rubber material, and is connected to an inner circumferential surface of the annular protruding portion 16d and an outer circumferential surface of the inner rigid body portion 16b.

An axial gap is provided between a lower surface of the inner rigid body portion 16b and an upper end opening edge of the inner intermediate cylinder 19, and a portion of the outer circumferential surface of the inner mounting member 12 is exposed to the second liquid chamber 15 through the gap.

Further, the present embodiment includes a second main body rubber 22 that partitions the first liquid chamber 14 into a third liquid chamber 20, of which a part of a partition wall is the upper first main body rubber 13a, and a fourth liquid chamber 21, of which a part of a partition wall is the partition member 16. The second main body rubber 22 divides the first liquid chamber 14 in the axial direction.

Respective volumes of the third liquid chamber 20, the fourth liquid chamber 21 and the second liquid chamber 15 are equal to one another.

Also, instead of this configuration, for example, the respective volumes of the third liquid chamber 20, the fourth liquid chamber 21 and the second liquid chamber 15 may be different from one another.

In addition, the second liquid chamber 15 may be divided by the second main body rubber 22 into a third liquid chamber 20, of which a part of a partition wall is the lower first main body rubber 13b, and a fourth liquid chamber 21, of which a part of a partition wall is the partition member 16.

The second main body rubber 22 has an annular shape and connects the outer mounting member 11 and the inner mounting member 12. A radial outer end portion of the second main body rubber 22 is bonded by vulcanization-bonding to the cylindrical body 25 and a radial outer end portion thereof is bonded by vulcanization-bonding to the inner mounting member 12. The second main body rubber 22 is connected to the outer mounting member 11 via the cylindrical body 25 and the outer rigid body portion 16a. The second main body rubber 22 extends gradually downward from the inner side toward the outer side in the radial direction. An axial gap is provided between the radial inner end portion of the second main body rubber 22 and the radial inner end portion of the upper first main body rubber 13a, and a part of the outer circumferential surface of the inner mounting member 12 is exposed to the third liquid chamber 20 through the gap.

Further, in the present embodiment, a first restriction passage 23 which communicates the fourth liquid chamber 21 with the second liquid chamber 15 or the third liquid chamber 20 and a second restriction passage 24 which communicates the second liquid chamber 15 with the third liquid chamber 20 are formed in the outer mounting member 11, the inner mounting member 12, or the partition member 16.

In the illustrated example, the first restriction passage 23 communicates the fourth liquid chamber 21 with the second liquid chamber 15 and is formed in the inner rigid body portion 16b of the partition member 16. Also, instead of this configuration, for example, the first restriction passage 23 may be formed in the outer rigid body portion 16a of the partition member 16.

The second restriction passage 24 is formed in the inner mounting member 12.

Here, the inner mounting member 12 includes an inner cylinder 26 and an outer cylinder 27 into which the inner cylinder 26 is fitted. Respective axial length and axial position of the inner cylinder 26 and the outer cylinder 27 are equal to each other. The mounting flange portion 12a is formed on the outer cylinder 27. Also, the inner mounting member 12 may be integrally formed.

The second restriction passage 24 includes an orifice groove 24a formed between the inner cylinder 26 and the outer cylinder 27, and two through-holes 24b which are formed in the outer cylinder 27 and provides communication between the orifice groove 24a and respectively the third liquid chamber 20 and the second liquid chamber 15. In the illustrated example, the orifice groove 24a is formed on an outer circumferential surface of the inner cylinder 26. The two through-holes 24b respectively open at both end portions of the orifice groove 24a.

Seal portions 28 are disposed between the inner cylinder 26 and the outer cylinder 27 at respective portions positioned on axial outer sides of the second restriction passage 24. Each seal portion 28 is configured by being disposed, for example, in a way that a single piece of annular elastic sealing material such as an O-ring is compressively deformed, in an annular groove formed on the outer circumferential surface of the inner cylinder 26 and an inner circumferential surface of the outer cylinder 27.

Further, in the present embodiment, any one of the second liquid chamber 15 and the third liquid chamber 20 is divided in the circumferential direction, and each of the liquid chambers divided in the circumferential direction communicates with the other of the second liquid chamber 15 and the third liquid chamber 20 through the second restriction passage 24.

Figure 2:
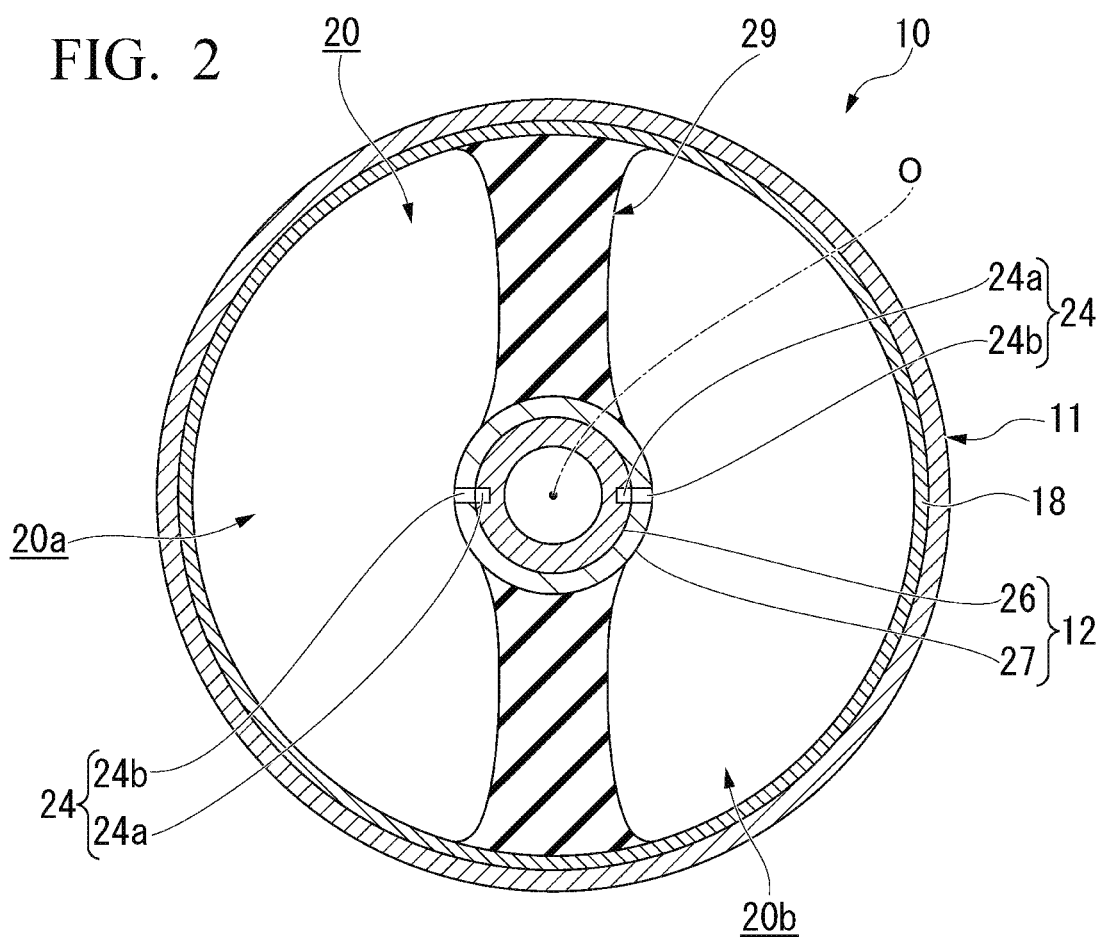
FIG. 2 is a cross-sectional view taken along line A-A of the vibration-damping device shown in FIG. 1.

As shown in FIG. 2, the third liquid chamber 20 is divided by an elastic dividing member 29 into two separate liquid chambers 20a and 20b in the circumferential direction. The elastic dividing member 29 is made of, for example, a rubber material or the like and connects portions of the inner circumferential surface of the outer mounting member 11 which are opposed to each other in the radial direction across the inner mounting member 12 in the radial direction. The elastic dividing member 29 extends in the radial direction and is disposed on the same straight line when viewed in the axial direction. Each of the separate liquid chambers 20a and 20b has the same size. Each of the separate liquid chambers 20a and 20b have a symmetrical shape with respect to the straight line in a cross-sectional view orthogonal to the central axis O. A radial outer end portion of the elastic dividing member 29 is connected to the inner circumferential surface of the outer intermediate cylinder 18 and is connected to the outer mounting member 11 via the outer intermediate cylinder 18. Also, the radial outer end portion of the elastic dividing member 29 may be directly connected to the outer mounting member 11. The elastic dividing member 29 is integrally formed with either one of the upper first main body rubber 13a or the second main body rubber 22.

Here, two second restriction passages 24 are formed in the inner mounting member 12 and provide communication between the two separate liquid chambers 20a and 20b and respectively one second liquid chamber 15. Respective flow resistances of the two second restriction passages 24 may be equal to or different from each other.

Two of the four through-holes 24b in the two second restriction passages 24 open at respective portions on the outer circumferential surface of the inner mounting member 12 exposed respectively to the separate liquid chambers 20a and 20b of the third liquid chamber 20, and the remaining two thereof open at portions on the outer circumferential surface of the inner mounting member 12 exposed to the second liquid chamber 15. The two through-holes 24b opening into the third liquid chamber 20 are opposed to each other in the radial direction. The two through-holes 24b opening into the second liquid chamber 15 are also opposed to each other in the radial direction.

The respective orifice grooves 24a of the two second restriction passages 24 are respectively disposed at portions in the inner mounting member 12 which have positions different from each other in the circumferential direction. One of the two orifice grooves 24a extends gradually from one side toward the other side in the circumferential direction as it goes from the third liquid chamber 20 side toward the second liquid chamber 15 side, and the other of the two orifice grooves 24a extends gradually from the other side toward one side in the circumferential direction as it goes from the third liquid chamber 20 side toward the second liquid chamber 15 side. Axial positions of the two orifice grooves 24a are the same as one another.

In the present embodiment, respective flow resistances of the first restriction passage 23 and the second restriction passage 24 are different from each other.

In the illustrated example, a flow passage cross-sectional area of the first restriction passage 23 is larger than a flow passage cross-sectional area of the second restriction passage 24. A flow passage length of the first restriction passage 23 is shorter than a flow passage length of the second restriction passage 24. In addition, a flow resistance of the first restriction passage 23 is smaller than a flow resistance of the second restriction passage 24.

Also, the flow passage cross-sectional area of the first restriction passage 23 may be equal to or less than the flow passage cross-sectional area of the second restriction passage 24, the flow passage length of the first restriction passage 23 may be equal to or longer than the flow passage length of the second restriction passage 24, and the flow resistance of the first restriction passage 23 may be larger than the flow resistance of the second restriction passage 24.

Next, operations of the vibration-damping device 10 will be described.

When an axial vibration is input, either one of the first liquid chamber 14 or the second liquid chamber 15 is compressively deformed while the other is expansively deformed. At this time, the pair of first main body rubbers 13a and 13b, the second main body rubber 22, the elastic dividing member 29, and the connecting elastic portion 16c of the partition member 16 are elastically deformed respectively.

Thus, the liquid flows between the fourth liquid chamber 21 and the second liquid chamber 15 through the first restriction passage 23 while the liquid flows between each of the separate liquid chambers 20a and 20b of the third liquid chamber 20 and the second liquid chamber 15 through the two second restriction passages 24. Therefore, liquid column resonance occurs in the first restriction passage 23 and the second restriction passage 24 so that vibration is damped and absorbed. At this time, since resonance frequencies in the first restriction passage 23 and the second restriction passage 24 are different from each other, damping characteristics can be provided over a wide band of frequencies.

Next, when a lateral vibration intersecting the axial direction is applied, either one of the separate liquid chambers 20a and 20b of the third liquid chamber 20 is compressively deformed and the other thereof is expansively deformed.

Thus, the liquid flows from one of the two separate liquid chambers 20a and 20b toward the second liquid chamber 15 through one of the two second restriction passages 24, and the liquid flows from the second liquid chamber 15 toward the other of the two separate liquid chambers 20a and 20b through the other of the two second restriction passages 24. Therefore, liquid column resonance occurs in the two second restriction passages 24 so that vibration is damped and absorbed.

As described above, according to the vibration-damping device 10 of the present embodiment, since all three liquid chambers 15, 20 and 21 communicating with the first restriction passage 23 and the second restriction passage 24 have at least one of the first main body rubbers 13a and 13b and the second main body rubber 22 as a part of the partition walls and become pressure-receiving liquid chambers in which a hydraulic pressure fluctuates with the input of vibration, an amount of fluctuation of the hydraulic pressure when vibration is input increases, so that excellent damping performance can be provided.

Also, since the resonance frequencies of the first restriction passage 23 and the second restriction passage 24 are different from each other, two resonance frequencies are present. Thus, it is possible to equalize between respective peaks of the damping characteristics in accordance with the liquid column resonance in the first restriction passage 23 and the second restriction passage 24 so that dynamic stiffness is reduced over a wide band of frequencies. Therefore, it is possible to inhibit an increase in stiffness when an axial vibration is input.

In addition, since the first restriction passage 23 provides communication between the fourth liquid chamber 21 and the second liquid chamber 15 and the second restriction passage 24 provides communication between the second liquid chamber 15 and the third liquid chamber 20, the second liquid chamber 15 is a common liquid chamber in which both the first restricting passage 23 and the second restricting passage 24 communicate with each other. Therefore, since another liquid chamber that communicates only with the fourth liquid chamber 21 can be omitted and the number of liquid chambers included in the vibration-damping device 10 can be reduced, miniaturization of the vibration-damping device 10 can be achieved.

Also, since the second restriction passage 24 communicating the second liquid chamber 15 and the third liquid chamber 20 which are disposed apart from each other in the axial direction with the fourth liquid chamber 21 therebetween is formed in the inner mounting member 12, a space for the second restriction passage 24 can be easily secured while inhibiting increase in size of the vibration-damping device 10.

In addition, since the inner mounting member 12 includes the inner cylinder 26 and the outer cylinder 27 and the second restriction passage 24 includes the orifice groove 24a formed between the inner cylinder 26 and the outer cylinder 27, the sealability of the second restriction passage 24 can be easily secured.

Further, since the seal portions 28 are disposed between the inner cylinder 26 and the outer cylinder 27, the sealability of the second restriction passage 24 can be reliably ensured.

Also, the separate liquid chambers 20a and 20b of the third liquid chamber 20 communicate with the second liquid chamber 15 through the two second restriction passages 24, respectively. Accordingly, when a lateral vibration intersecting the axial direction is input, the liquid is caused to flow in and out between the separate liquid chambers 20a and 20b and the second liquid chamber 15 through the second restriction passages 24, whereby vibration can be damped and absorbed.

At this time, since the hydraulic pressure of each of the separate liquid chambers 20a and 20b fluctuates but the hydraulic pressure of the second liquid chamber 15 does not fluctuate, increase in the generated damping force can be inhibited in contrast to a case where an axial vibration is input. Therefore, for example, it is possible to improve the ride comfort when a lateral vibration is input.

Also, the technical scope of the present invention is not limited to the above embodiment, and various modifications can be made without departing from the scope of the present invention.

In the above embodiment, for example, although the configuration in which the partition member 16 includes the outer rigid body portion 16a, the inner rigid body portion 16b, and the connecting elastic portion 16c has been described, the present invention is not limited to such an embodiment. For example, a configuration including only the rigid body portion or a configuration including the outer rigid body portion 16a or the inner rigid body portion 16b and the connecting elastic portion 16c may be employed.

In the above embodiment, although the configuration in which the vibration-damping device 10 is divided into three liquid chambers which are the second liquid chamber 15, the third liquid chamber 20, and the fourth liquid chamber 21 in the axial direction has been described, the present invention is also applicable to a configuration having four or more liquid chambers.

In the above embodiment, although the configuration in which the third liquid chamber 20 is divided into two in the circumferential direction and two second restriction passages 24 are provided has been described, the present invention is also applicable to a configuration in which the third liquid chamber 20 is divided into three or more in the circumferential direction and three or more second restriction passages 24 are provided.

In the above embodiment, although the configuration in which the third liquid chamber 20 is divided in the circumferential direction and the first restriction passage 23 communicates the fourth liquid chamber 21 and the second liquid chamber 15 has been described, this may be changed as appropriate. For example, the third liquid chamber 20 may be divided in the circumferential direction and the first restriction passage 23 may communicate the fourth liquid chamber 21 with the third liquid chamber 20, and the second liquid chamber 15 may be divided in the circumferential direction.

The vibration-damping device 10 is not limited to a cabin mount of a vehicle and is also applicable to other than a cabin mount. For example, the present invention can be applied to an engine mount and a bush for vehicles, a mount of a generator mounted on a construction machine, or a mount of a machine installed in a factory, etc.

In addition, it is possible to replace components in the above embodiment with known components as appropriate without departing from the spirit of the present invention, and the modifications described above may be combined as appropriate.

According to the present invention, when an axial vibration is input, the first main body rubbers and the second main body rubber are elastically deformed, and each of the liquid pressures in the first liquid chamber and the second liquid chamber tends to fluctuate. At this time, the liquid is circulated through the first restriction passage and the second restriction passage, whereby vibration is damped and absorbed.

Also, since all three liquid chambers in communication with the first restriction passage and the second restriction passage have at least one of the first main body rubbers and the second main body rubber as a part of the partition walls and become pressure-receiving liquid chambers in which a hydraulic pressure fluctuates with the input of vibration, an amount of fluctuation of the hydraulic pressure when vibration is input increases, so that excellent damping performance can be provided.

In addition, since the resonance frequencies of the first restriction passage and the second restriction passage are different from each other, two resonance frequencies are present. Thus, it is possible to equalize between respective peaks of the damping characteristics in accordance with the liquid column resonance in the first restriction passage and the second restriction passage so that a dynamic stiffness is reduced over a wide band of frequencies. Therefore, it is possible to inhibit an increase in stiffness when an axial vibration is input.

Further, since the first restriction passage communicates the fourth liquid chamber with the second liquid chamber or the third liquid chamber and the second restriction passage communicates the second liquid chamber with the third liquid chamber, the second liquid chamber or the third liquid chamber becomes a common liquid chamber in which both the first restricting passage and the second restricting passage communicate with each other. Therefore, since another liquid chamber that communicates only with the fourth liquid chamber can be omitted and the number of liquid chambers included in the vibration-damping device can be reduced, miniaturization of the vibration-damping device can be achieved.

Here, the inner mounting member may include the inner cylinder and the outer cylinder into which the inner cylinder is fitted, and the second restriction passage may include the orifice groove formed between the inner cylinder and the outer cylinder.

In this case, since the second restriction passage communicating the second liquid chamber and the third liquid chamber which are disposed apart from each other in the axial direction across the fourth liquid chamber is formed in the inner mounting member, the space for the second restriction passage can be easily secured while inhibiting increase in size of the vibration-damping device. In addition, since the inner mounting member includes the inner cylinder and the outer cylinder and the second restriction passage includes the orifice groove formed between the inner cylinder and the outer cylinder, the sealability of the second restriction passage can be easily secured.

Also, the seal portions may be disposed between the inner cylinder and the outer cylinder at respective portions positioned on the axial outer sides of the second restriction passage.

In this case, since the seal portions 28 are disposed between the inner cylinder 26 and the outer cylinder 27, the sealability of the second restriction passage 24 can be reliably ensured.

Further, any one of the second liquid chamber and the third liquid chamber may be divided in the circumferential direction around the central axis into liquid chambers, and each of the liquid chambers and the other of the second liquid chamber and the third liquid chamber may communicate with each other through the second restriction passage individually.

In this case, any one of the second liquid chamber and the third liquid chamber is divided in the circumferential direction and each of the separate liquid chambers (hereinafter referred to as separate liquid chambers) and the other of the second liquid chamber and the third liquid chamber communicate with each other through the second restriction passage. Accordingly, when a lateral vibration intersecting the axial direction is input, the liquid is caused to flow in and out between the divided liquid chambers and the other liquid chamber through the second restriction passage, whereby vibration can be damped and absorbed.

At this time, since the hydraulic pressure of each of the separate liquid chambers fluctuates but the hydraulic pressure of the other liquid chamber does not fluctuate, the generated damping force can be inhibited from increasing as compared with a case where an axial vibration is input. Therefore, for example, it is possible to improve the ride comfort when a lateral vibration is input.

Also, in this configuration, the first restriction passage may communicate the other of the second liquid chamber or the third liquid chamber with the fourth liquid chamber.

INDUSTRIAL APPLICABILITY

According to the present invention, it is possible to inhibit an increase in stiffness when a vibration is input while excellent damping performance is exhibited.

REFERENCE SIGNS LIST

10 Vibration-damping device
11 Outer mounting member
12 Inner mounting member
13a, 13b First main body rubber
14 First liquid chamber
15 Second liquid chamber
16 Partition members
17 Liquid chamber
20 Third liquid chamber
21 Fourth liquid chamber
22 Second main body rubber
23 First restriction passage
24 Second restriction passage
24a Orifice groove
26 Inner cylinder
27 Outer cylinder
28 Seal portion

The invention claimed is:

1. A vibration-damping device, comprising:
a cylindrical outer mounting member which is connected to either one of a vibration-generating portion or a vibration-receiving portion and an inner mounting member which is connected to the other of the vibration-generating portion and the vibration-receiving portion and is disposed inside the outer mounting member;
a pair of first main body rubbers which connect the outer mounting member and the inner mounting member and are disposed at an interval in an axial direction along a central axis of the outer mounting member;
a partition member which partitions a liquid chamber between the pair of first main body rubbers into a first liquid chamber and a second liquid chamber in the axial direction; and
a second main body rubber which divides the first liquid chamber into a third liquid chamber that uses the first main body rubbers as a part of a partition wall and a fourth liquid chamber that uses the partition member as a part of a partition wall,
wherein a first restriction passage which communicates the fourth liquid chamber with the second liquid chamber or the third liquid chamber and a second restriction passage which communicates the second liquid chamber with the third liquid chamber are formed in the outer mounting member, the inner mounting member, or the partition member,
respective flow resistances of the first restriction passage and the second restriction passage are different from each other, and
the axial direction is directed in a vertical direction.

2. The vibration-damping device according to claim 1, wherein the inner mounting member includes an inner cylinder and an outer cylinder into which the inner cylinder is fitted, and
the second restriction passage includes an orifice groove formed between the inner cylinder and the outer cylinder.

3. The vibration-damping device according to claim 2, wherein seal portions are disposed between the inner cylinder and the outer cylinder at respective portions positioned on an outer side in the axial direction of the second restriction passage.

4. The vibration-damping device according to claim 1, wherein any one of the second liquid chamber and the third liquid chamber is divided in a circumferential direction around the central axis into liquid chambers, and each of the liquid chambers and the other of the second liquid chamber and the third liquid chamber communicate with each other through the second restriction passage.

5. The vibration-damping device according claim 2, wherein any one of the second liquid chamber and the third liquid chamber is divided in a circumferential direction around the central axis into liquid chambers, and each of the liquid chambers and the other of the second liquid chamber and the third liquid chamber communicate with each other through the second restriction passage.

6. The vibration-damping device according claim 3, wherein any one of the second liquid chamber and the third liquid chamber is divided in a circumferential direction around the central axis into liquid chambers, and each of the liquid chambers and the other of the second liquid chamber and the third liquid chamber communicate with each other through the second restriction passage.

* * * * *